Nov. 3, 1964    L. G. JORGENSEN    3,155,563
MOTION PICTURE FILM SPLICING DEVICE
Filed Feb. 21, 1963    2 Sheets-Sheet 2
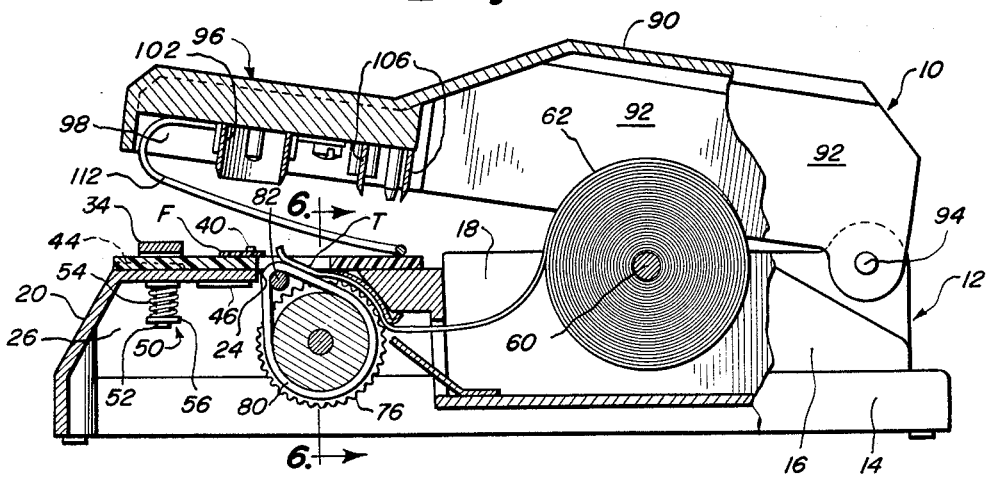
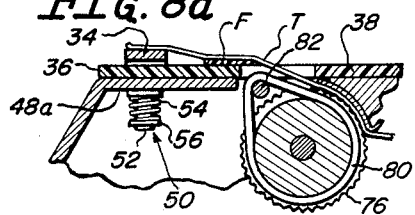
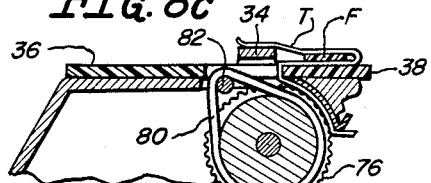
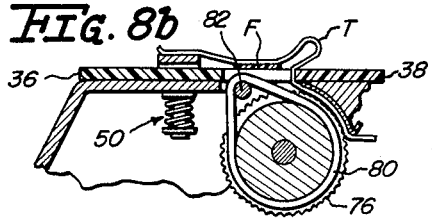
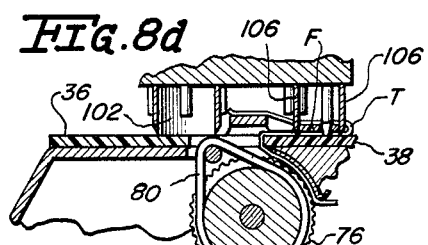
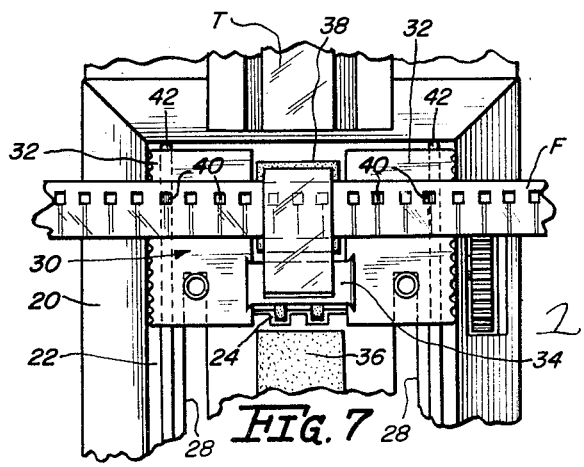
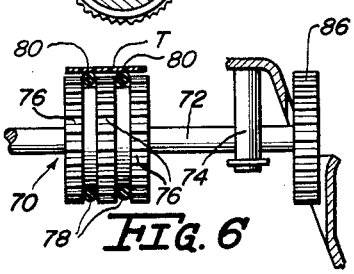
INVENTOR.
Leif G. Jorgensen 3,155,563
MOTION PICTURE FILM SPLICING DEVICE
Leif G. Jorgensen, 517 W. St. Charles Road, Lombard, Ill.
Filed Feb. 21, 1963, Ser. No. 260,277
17 Claims. (Cl. 156—505)

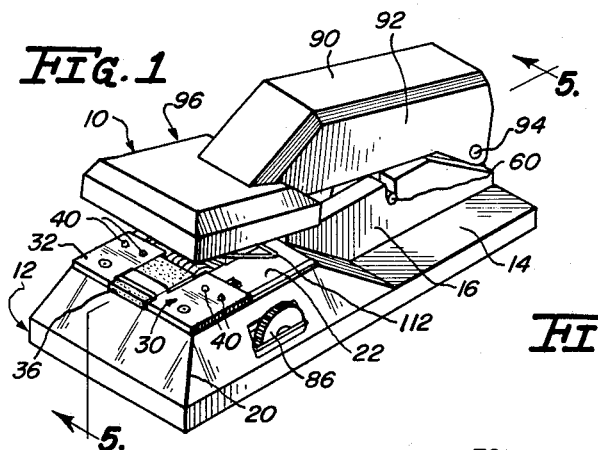

This invention relates to film splicing and more particularly to a device for joining the adjacent ends of a pair of motion picture film strips by wrapping them with a band of adhesive, transparent material such as plastic tape.

The invention relates to an improved device for performing a semi-automatic, "dry-splice" of film strip ends.

It is well known to those familiar with the art of film splicing that a conventional "dry-splice" is accomplished by the use of a strip of adhesive, transparent tape covering one or both surfaces of the film ends.

One method of splicing film ends is by applying to one or both surfaces of the film ends a strip of tape extending in a direction parallel to the longitudinal axis of the film. An example of this method is disclosed in United States Letters Patent Number 2,794,489.

This type of splice is not as strong or permanent, and obviously not as desirable, as the type of splice wherein the tape is wrapped transversely around the film ends in the manner disclosed in United States Letters Patent Number 2,346,874.

The film splicers which wrap a band of tape around the film ends generally require varying degrees of manual dexterity on the part of the operator in placing the film on the tape, or vice versa, and requires some type of multi-step operation to position the tape over both sides of the film.

Although there are, of course, certain automatic splicing machines available for use by the motion picture industry, these machines are necessarily far too complex and expensive to be practical for use by the amateur or home movie producer.

It is, therefore, a primary object of this invention to provide a relatively simple, inexpensive film splicer for wrapping a band of adhesive, transparent tape transversely around a pair of adjacent, abutting film strip ends in a semi-automatic one-step motion.

A more specific object of the invention is the provision, in a film splicing device of the type described, of a pair of hinged jaw members one of which has a film transporting carriage slidably mounted on a table for reciprocal movement between two stations located on opposite sides of an opening in the table, and means for feeding the free end of a roll of tape rotatably carried by the member, across said film ends, when they are at the first station, so that as they are moved on the carriage to the second station, the tape will automatically be wrapped around both sides of the film strip ends.

These and other objects of the invention will be apparent from an examination of the following description and drawings, wherein:

FIGURE 1 is a perspective view of a film splicing device embodying features of the invention, with the jaw members shown in a partially closed position;

FIGURE 2 is a view similar to FIGURE 1, but with the jaw members shown in a fully open position;

FIGURE 3 is an elevational view, taken on line 3—3 of FIGURE 2, of the head portion of the upper jaw member;

FIGURE 4 is an elevational view, taken on line 4—4 of FIGURE 2, of the table portion of the lower jaw member, with the film shown in the forward position at the first station;

FIGURE 5 is a longitudinal, vertical section taken on line 5—5 of FIGURE 1;

FIGURE 6 is a transverse, vertical section taken on line 6—6 of FIGURE 5;

FIGURE 7 is a view similar to FIGURE 4, but with the film shown in the rearward position at the second station; and FIGURES 8a, 8b, 8c, and 8d are fragmentary views of a portion of the structure illustrated in FIGURE 5, with the film shown in various positions on the carriage of the lower jaw member table deck.

It will be understood that, for purposes of clarity, certain elements have been intentionally omitted from certain views where they are illustrated to better advantage in other views.

Referring now to the drawings for a better understanding of the invention, and particularly to FIGURES 1 and 2, it will be seen that the film splicer emboding features of the invention comprises a pair of upper and lower jaw members, indicated generally at 10 and 12, respectively, which are hingedly interconnected at corresponding rearward ends in a manner hereinafter described.

The rearward portion of the lower jaw member or base 12 includes a horizontal bed 14 having upstanding therefrom a pair of longitudinally extending, vertical walls 16 spaced transversely of the bed from each other to define a tape receiving channel 18 therebetween.

The forward portion of the base includes a hollow, generally frusto-pyramid shaped table 20 having a relatively thin, flat, horizontally disposed top wall or deck 22 with a centrally located opening 24 extending vertically therethrough to communicate with a downwardly facing cavity or pocket 26 under the table deck. On opposite sides of the central opening and spaced transversely therefrom the deck presents a pair of parallel, longitudinally extend slots 28.

As best seen in FIGURE 2 a film retaining and transporting carriage or slide member 30 is slidably mounted on the deck for reciprocal movement longitudinally thereof between first and second positions or stations located forwardly and rearwardly respectively, adjacent the edges of said central opening at the extremities of slots 28. Carriage 30 includes a pair of relatively thin, flat plates 32 spaced from each other transversely of the deck on opposite sides of opening 24 and interconnected at their forward ends by a relatively thin, narrow, integral strip or bridge 34 disposed to extend transversely of the deck across opening 24 when the carriage is moved between said first and second positions.

In order to facilitate the cutting and perforating of the film and splicing tape there may be positioned on and secured to the upper surface of the deck, adjacent the forward and rearward edges of opening 24 at said first and second stations, a pair of relatively thin, flat first and second cutting blocks or anvils 36 and 38, respectively, which are preferably formed of a resilient material such as plastic or hard rubber. Both of the blocks are of the same thickness or height as the plates of the carriage. Thus, the upper surfaces of the blocks and carriage plates lie in the same general horizontal plane, so that film resting on both the carriage and block will be level, and also the elevated bridge of the carriage can clear a cutting block as it passes over it.

At their forward ends the plates have upwardly projecting retaining or locating pins 40 which are aligned transversely of the carriage plates with each other and spaced from each other the same distance as the distance between the sprocket holes in standard motion picture film.

The upper surface of the deck may be provided, inwardly adjacent its side edges, with a pair of parallel, longitudinally extending ridges or beads 42, disposed outboardly of respective slots 28 and adapted to cooperate with complementary grooves 44 in the underside of the plates to guide the carriage in a straight line as it travels back and forth on the deck between the first and second stations.

The under side of the deck may also be provided immediately adjacent the edges of each slot 28 with a pair of somewhat similar, but downwardly extending, ridges or beads 46 which do not extend the entire length of the related slot, so that the underside of the deck presents a flat, non-ridged area at each end of the slot. The purpose of this arrangement is to facilitate the positive positioning of the carriage at either station in a manner hereinafter described.

The plates of the carriage each have a downwardly projecting guide pin 50 disposed to extend downwardly through a related slot 28. At its lower end each pin 50 is provided with a flared or enlarged portion 52 adapted to retain in position a helical compression spring sleeved over pin 50. Also disposed on each pin 50 between the upper end of spring 54 and the underside of the deck is a washer 56. As the spring is under compression it tends to bias the plates of the carriage snugly against the upper surface of the deck as the carriage travels across the deck between the first and second stations. When the plates of the carriage reach either end of the slots the springs urge related washers 56, which have been riding against related ridges 46, up against the underside of the deck at non-ridged areas 48a and 48b at the first and second stations, to afford a detent type arrangement for releasably locking the carriage at either station. As the carriage travels between stations the washers are cammed up and down the ends of the ridges by the inclined ends of the ridges.

As best seen in FIGURE 4, the upper edges of walls 16 present a pair of opposed, aligned recesses 58 for receiving and retaining the ends of a horizontally disposed, transversely extending shaft 60 on which is rotatably mounted a spool or roll 62 of adhesive, transparent material T, such as Mylar plastic tape, used for splicing the adjacent abutting ends of a pair of motion picture film strips F.

The tape is fed from the roll up through central opening 24 in the deck by a feed mechanism indicated generally at 70, housed in pocket 26 of the lower jaw member table. As best seen in FIGURE 6 of the drawings, feed mechanism 70 includes a transversely extending shaft 72, journally supported by the side of the table, as at 74. Centrally on the shaft, in lateral alignment with deck opening 24, there is non-rotatably mounted a preferably knurled pulley wheel 76 having cut therein a pair of axially spaced peripheral grooves 78 which carry the lower portions of a pair of endless conveyor belts 80 which are preferably formed of a flexible material such as rubber. The upper portions of belts 80 are carried by a transversely extending shaft 82, the ends of which are disposed in recesses 84 in the top tof the deck at opposite sides of deck opening 24. Thus, as best seen in FIGURES 8a–8d, the belts project a slight distance above the deck upper surface in general vertical alignment with the horizontal plane of the upper surfaces of the carriage plates and cutting blocks. At one end of shaft 72 there is fixedly mounted a knurled drive or actuating wheel 86 which is disposed at least partially outside of the table pocket so as to be accessible to the person operating the device. It will be understood that as wheel 86 is rotated in a counter-clockwise direction, as seen in FIGURES 8a–8d, the free end of the tape is transported from the roll up through deck opening 24, so that the tape can be placed across the upper surfaces of the abutting film strip ends which are on the plates of the film carriage at the first position or station forwardly adjacent deck opening 24.

Turning now to FIGURES 2 and 3, it will be seen that upper jaw member 10 is an elongated arm-like member, somewhat similar to lower jaw member 12, and includes a top wall 90 having a pair of depending, transversely spaced longitudinally extending side walls 92 which are pivotally connected at their rearward ends by, a hinge pin 94, to corresponding rearward ends of lower jaw member side walls 16.

The forward portion of the upper jaw member 10 includes a hollow head, indicated generally at 96, which presents on the underside thereof a downwardly facing cavity or pocket 98 within which is positioned the film and tape cutting and perforating mechanism, indicated generally at 100, and hereinafter described.

As best seen in FIGURE 5, there are two sets of cutting elements 102 and 106 mounted in the upper jaw member head and located longitudinally of the head from each other so as to be in lateral alignment with cutting blocks 36 and 38, respectively at the first and second stations on the table deck when the jaw members are closed.

The forward cutting element is a preferably V-shaped cutting blade 102 which, as best seen in FIGURE 3, is releasably held in place by a plurality of retaining pins or studs 104 projecting downwardly from the top wall 90 of the head.

The rearward cutting element comprises a pair of transversely extending, generally parallel cutting blades 106 which are spaced longitudinally of the head from each other a distance equal to, or slightly less than, the width of the film strips to be spliced. Blades 106 may also be held in place by a plurality of retaining pins 108 projecting downwardly from the head top wall. Pins 108 are preferably located so as to maintain blades 106 in a slightly inwardly bowed condition.

Also positioned inwardly adjacent the rearwardmost of the cutting blades 106 are a plurality of perforating pins projecting downwardly from the head top wall in alignment with each other and with the sprocket holes of the film strip ends. The function of the pins 114 is described later in the specification.

Additionally there is mounted in the upper jaw member head, by a pair of screws 110, a looped, hair-pin type spring 112 which, as best seen in FIGURES 3 and 5 is formed and located to surround the cutting elements and engage the upper surface of the lower jaw member deck when the jaw members are in closed position so as to offer a slight degree of resistance to the downward movement of the upper jaw member against the lower jaw member as the members are moved together in the cutting and perforating operation.

Now to describe the function and operation of the device, it will be understood by those familiar with the art of film splicing that the first step in repairing a broken strip of film is to trim the jagged ends to provide a clean cut which will permit the adjacent ends of the strips to be placed in snug end-to-end, abutting relationship for the splicing operation.

First, the film carriage is moved by the operator manually to the forwardmost position or first station. The adjacent film strip ends are then positioned on the respective plates of the film carriage, as shown in FIGURE 4, with the plate pins 40 registered in the sprocket holes of the film strips and with the adjacent ends of the film strips overlapped a slight amount on cutting block 36.

The upper jaw member is then lowered until it is supported on the deck of the lower jaw member table by spring 112. When the top of the upper jaw member head is struck by the operator forward cutting blade 102 severs the overlapped film strip ends to provide a clean common end edge as seen in FIGURE 4.

After the excess or trimmed pieces of the film strips have been removed, the film strip ends are replaced on the film carriage with their ends disposed in snug, end-to-end, abutting relation. Tape drive wheel 86 is then rotated counterclockwise until sufficient tape is provided to cover the abutting film strip ends with the tape, as best seen in FIGURE 8a.

The film carriage is then moved rearwardly by the operator until it is in the rearwardmost position at the second station, as shown in FIGURE 8d.

In this movement resides an essential feature of the invention, for it will be seen that as the film travels rearwardly from the first to the second station, passing through the positions illustrated in FIGURES 8a–8d, a band of tape is automatically wrapped around the upper and lower surfaces and rear side edge of the film strip ends, with the leading and trailing portions of the tape extending forwardly from the forward side edges of the film strip ends. Thus, by the one step of moving the film carriage rearwardly from the first to the second station the tape is applied to both surfaces of the film without any necessity for lifting the film or turning it over, as required by many of the prior art devices.

Also, because the film and tape are accurately guided at all times, the positioning of the tape around the film is virtually automatic and always uniform.

After the tape has been wrapped around the film in the manner previously described, and while the carriage is still at the second station with the joined portions of the film strip on cutting block 38, the upper jaw member is again lowered until it is supported on the deck by spring 112. As the head of the upper jaw member is again struck by the operator, the rear cutting blades 106 trim the excess tape at the front and rear side edges of the film, and at the same time perforating pins 114 perforate the tape at the places where it covers the film sprocket holes.

Thus in another simple one-step operation the tape has been trimmed away at the side edges of the film and, at the same time the tape has been perforated to permit the taped or spliced film to be run through a projector.

It will be understood that pre-perforated tape in roll form may be used on the splicer of the invention, if desired. If this is done the perforating pins 114 may be eliminated, and the roll of tape may be provided with transversely extending rows of perforations spaced uniformly from each other throughout the length of the tape.

I claim:

1. A device for splicing adjacent ends of a pair of motion picture film strips in end-to-end, abutting relation by wrapping them with a band of adhesive, transparent material, such as plastic tape, from roll stock, comprising:
   (a) a pair of upper and lower jaw members hingedly interconnected at their rearward ends and presenting at their forward ends hollow head and table portions, respectively, with downwardly facing pockets;
   (b) said table portion including a generally horizontally disposed, flat deck with a central opening extending vertically therethrough in communication with said pocket;
   (c) a pair of relatively thin, flat, resilient first and second cutting blocks secured to the upper surface of said deck forwardly and rearwardly, respectively, adjacent said opening;
   (d) a single cutting blade mounted in the pocket of the upper jaw member head portion and disposed to extend longitudinally of said first cutting block for contact therewith when said jaw members are in closed position;
   (e) a pair of spaced cutting blades mounted in the pocket of said head portion and disposed to extend transversely of said second cutting block for contact therewith when said jaw members are in closed position;
   (f) a film retaining and transporting carriage having interconnected plate sections slidably mounted on said deck for reciprocal movement on opposite sides of said opening longitudinally of the deck between first and second positions located adjacent said first and second cutting blocks, respectively;
   (g) the plate sections of said film carriage including aligned, upwardly projecting pins for positioning a pair of film strip ends thereon;
   (h) a shaft carried by said lower jaw member for rotatably supporting a spool of tape;
   (i) a pair of conveyer belts rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends; and
   (j) a plurality of downwardly projecting pins mounted in the pocket of said upper jaw member adjacent one of said pair of cutting blades and disposed to project through said tape at the sprocket holes of the film ends to perforate the tape.

2. A device for splicing adjacent ends of a pair of motion picture film strips in end-to-end, abutting relation by wrapping them with a band of adhesive, transparent material, such as plastic tape, from roll stock, comprising:
   (a) a pair of upper and lower jaw members hingedly interconnected at their rearward ends and presenting at their forward ends hollow head and table portions, respectively, with downwardly facing pockets;
   (b) said table portion including a generally horizontally disposed, flat deck with a central opening extending vertically therethrough in communication with said pocket;
   (c) a pair of relatively thin, flat, resilient first and second cutting blocks secured to the upper surface of said deck forwardly and rearwardly, respectively, adjacent said opening;
   (d) a single cutting blade mounted in the pocket of the upper jaw member head portion and disposed to extend longitudinally of said first cutting block for contact therewith when said jaw members are in closed position;
   (e) a pair of spaced cutting blades mounted in the pocket of said head portion and disposed to extend transversely of said second cutting block for contact therewith when said jaw members are in closed position;
   (f) a film retaining and transporting carriage having interconnected plate sections slidably mounted on said deck for reciprocal movement on opposite sides of said opening longitudinally of the deck between first and second positions located adjacent said first and second cutting blocks, respectively;
   (g) the plate sections of said film carriage including aligned, upwardly projecting pins for positioning a pair of film strip ends thereon; and
   (h) a pair of conveyor belts rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

3. A device for splicing adjacent ends of a pair of motion picture film strips in end-to-end, abutting relation by wrapping them with a band of adhesive transparent material, such as plastic tape, from roll stock, comprising:
   (a) a pair of upper and lower jaw members hingedly interconnected at their rearward ends and presenting at their forward ends hollow head and table portions, respectively, with downwardly facing pockets;
   (b) said table portion including a generally horizontally disposed, flat deck with a central opening extending vertically therethrough in communication with said pocket;
   (c) a pair of relatively thin, flat, resilient first and second cutting blocks secured to the upper surface of said deck forwardly and rearwardly, respectively, adjacent said opening;

(d) a pair of spaced cutting blades mounted in the pocket of said head portion and disposed to extend transversely of said second cutting block for contact therewith when said jaw members are in closed position;

(e) a film retaining and transporting carriage having interconnected plate sections slidably mounted on said deck for reciprocal movement on opposite sides of said opening longitudinally of the deck between first and second positions located adjacent said first and second cutting blocks, respectively;

(f) the plate sections of said film carriage including aligned, upwardly projecting pins for positioning a pair of film strip ends thereon;

(g) a shaft carried by said lower jaw member for rotatably supporting a spool of tape;

(h) a pair of conveyer belts rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

4. A device for splicing adjacent ends of a pair of motion picture film strips in end-to-end, abutting relation by wrapping them with a band of adhesive, transparent material, such as plastic tape, from roll stock, comprising:

(a) a pair of upper and lower jaw members hingedly interconnected at their rearward ends and presenting at their forward ends hollow head and table portions, respectively, with downwardly facing pockets;

(b) said table portion including a generally horizontally disposed, flat deck with a central opening extending vertically therethrough in communication with said pocket;

(c) a pair of relatively thin, flat, resilient first and second cutting blocks secured to the upper surface of said deck forwardly and rearwardly, respectively, adjacent said opening;

(d) a film retaining and transporting carriage having interconnected plate sections slidably mounted on said deck for reciprocal movement on opposite sides of said opening longitudinally of the deck between first and second positions located adjacent said first and second cutting blocks, respectively;

(e) the plate sections of said film carriage including aligned, upwardly projecting pins for positioning a pair of film strip ends thereon;

(f) a shaft carried by said lower jaw member for rotatably supporting a spool of tape;

(g) a pair of conveyer belts rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

5. A device for splicing ends of a pair of motion picture film strips in end-to-end, abutting relation by wrapping them with a band of adhesive, transparent material, such as plastic tape, from roll stock, comprising:

(a) a pair of upper and lower jaw members hingedly interconnected at their rearward ends and presenting at their forward ends hollow head and table portions, respectively, with downwardly facing pockets;

(b) said table portion including a generally horizontally disposed, flat deck with a central opening extending vertically therethrough in communication with said pocket;

(c) a pair of relatively thin, flat, resilient first and second cutting blocks secured to the upper surface of said deck forwardly and rearwardly, respectively, adjacent said opening;

(d) a film retaining and transporting carriage having interconnected plate sections slidably mounted on said deck for reciprocal movement on opposite sides of said opening longitudinally of the deck between first and second positions located adjacent said first and second cutting blocks, respectively;

(e) the plate sections of said film carriage including aligned, upwardly projecting pins for positioning a pair of film strip ends thereon;

(f) a pair of conveyor belts rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

6. A device for splicing adjacent ends of a pair of motion picture film strips in end-to-end, abutting relation by wrapping them with a band of adhesive, transparent material, such as plastic tape, from roll stock, comprising:

(a) a pair of upper and lower jaw members hingedly interconnected at their rearward ends and presenting at their forward ends hollow head and table portions, respectively, with downwardly facing pockets;

(b) said table portion including a generally horizontally disposed, flat deck with a central opening extending vertically therethrough in communication with said pocket;

(c) a pair of relatively thin, flat, resilient first and second cutting blocks secured to the upper surface of said deck forwardly and rearwardly, respectively, adjacent said opening;

(d) a film retaining and transporting carriage having interconnected plate sections slidably mounted on said deck for reciprocal movement on opposite sides of said opening longitudinally of the deck between first and second positions located adjacent said first and second cutting blocks respectively;

(e) the plate sections of said film carriage including aligned upwardly projecting pins for positioning a pair of film strip ends thereon;

(f) a conveyor belt rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

7. A device for splicing adjacent ends of a pair of motion picture film strips in end-to-end, abutting relation by wrapping them with a band of adhesive, transparent material, such as plastic tape, from roll stock, comprising:

(a) a pair of upper and lower jaw members hingedly interconnected at their rearward ends and presenting at their forward ends hollow head and table portions, respectively, with downwardly facing pockets;

(b) said table portion including a generally horizontally disposed, flat deck with a central opening extending vertically therethrough in communication with said pocket;

(c) a film retaining and transporting carriage having interconnected plate sections slidably mounted on said deck for reciprocal movement on opposite sides of said opening lonigtudinally of the deck between first and second positions located forwardly and rearwardly adjacent said deck opening;

(d) the plate sections of said film carriage including aligned, upwardly projecting pins for positioning a pair of film strip ends thereon;

(e) a conveyer rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

8. A device for splicing adjacent ends of a pair of motion picture film strips in end-to-end, abutting relation by wrapping them with a band of adhesive, transparent material, such as plastic tape, from roll stock, comprising:

(a) a pair of upper and lower jaw members hingedly interconnected at their rearward ends and presenting at their forward ends hollow head and table portions, respectively, with downwardly facing pockets;

(b) said table portion including a generally horizontally disposed, flat deck with an opening extending vertically therethrough in communication with said pocket;

(c) a film retaining and transporting carriage slidably mounted on said deck for reciprocal movement on opposite sides of said opening longitudinally of the deck between first and second positions located forwardly and rearwardly, adjacent said deck opening;

(d) a conveyer rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

9. A device for splicing adjacent ends of a pair of motion picture film strips in end-to-end, abutting relation by wrapping them with a band of adhesive, transparent material, such as plastic tape, from roll stock, comprising:

(a) a pair of upper and lower jaw members hingedly interconnected at their rearward ends and presenting at their forward ends hollow head and table portions, respectively, with downwardly facing pockets;

(b) said table portion including a generally horizontally disposed, flat deck with an opening extending vertically therethrough in communication with said pocket;

(c) a pair of relatively thin, flat, resilient first and second cutting blocks secured to the upper surface of said deck forwardly and rearwardly, respectively, adjacent said opening;

(d) a single cutting blade mounted in the pocket of the upper jaw member head portion and disposed to extend longitudinally of said first cutting block for contact therewith when said jaw members are in closed position;

(e) a pair of spaced cutting blades mounted in the pocket of said head portion and disposed to extend transversely of said second cutting block for contact therewith when said jaw members are in closed position;

(f) a film retaining and transporting carriage slidably mounted on said deck for reciprocal movement on opposite sides of said opening longitudinally of the deck between first and second positions located adjacent said first and second cutting blocks, respectively;

(g) said film carriage including aligned, upwardly projecting pins for positioning a pair of film strip ends thereon;

(h) a tape feeding mechanism mounted in said table pocket for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

10. A device for splicing adjacent ends of a pair of motion picture film strips in end-to-end, abutting relation by wrapping them with a band of adhesive, transparent material, such as plastic tape, from roll stock, comprising:

(a) a pair of upper and lower jaw members hingedly interconnected and presenting at corresponding ends head and table portions, respectively;

(b) said table portion including a generally horizontally disposed, flat deck with an opening extending vertically therethrough in communication with said pocket;

(c) a single cutting blade mounted in the pocket of the upper jaw member head portion and disposed to extend longitudinally of said deck for contact therewith when said jaw members are in closed position;

(d) a pair of spaced cutting blades mounted in the pocket of said head portion and disposed to extend transversely of said deck for contact therewith when said jaw members are in closed position;

(e) a film retaining and transporting carriage slidably mounted on said deck for reciprocal movement on opposite sides of said opening longitudinally of the deck between first and second positions located forwardly and rearwardly adjacent said deck opening;

(f) a shaft carried by said lower jaw member for rotatably supporting a spool of tape;

(g) a pair of conveyer belts rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

11. A device for splicing adjacent ends of a pair of motion picture film strips in end-to-end, abutting relation by wrapping them with a band of adhesive, transparent material, such as plastic tape, from roll stock, comprising:

(a) a base member presenting a hollow table portion, with a downwardly facing pocket;

(b) said table portion including a generally horizontally disposed, flat deck with a central opening extending vertically therethrough in communication with said pocket;

(c) a film retaining and transporting carriage having interconnected plate sections slidably mounted on said deck for reciprocal movement on opposite sides of said opening longitudinally of the deck between first and second positions located forwardly and rearwardly adjacent said deck opening;

(d) the plate sections of said film carriage including aligned, upwardly projecting pins for positioning a pair of film strip ends thereon;

(e) a shaft carried by said base member for rotatably supporting a spool of tape;

(f) a pair of conveyor belts rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

12. A device for splicing adjacent ends of a pair of motion picture film strips in end-to-end, abutting relation by wrapping them with a band of adhesive, transparent material, such as plastic tape, from roll stock, comprising:
  (a) a base member having a hollow table portion, with a downwardly facing pocket;
  (b) said table portion including a generally horizontally disposed, flat deck with a central opening extending vertically therethrough in communication with said pocket;
  (c) a film retaining and transporting carriage having interconnected plate sections slidably mounted on said deck for reciprocal movement on opposite sides of said opening longitudinally of the deck between first and second positions;
  (d) the plate sections of said film carriage including aligned upwardly projecting pins for positioning a pair of film strip ends thereon;
  (e) a pair of conveyer belts rotatably mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

13. A device for splicing adjacent ends of a pair of motion picture film strips in end-to-end, abutting relation by wrapping them with a band of adhesive, transparent material, such as plastic tape, from roll stock, comprising:
  (a) a base member having a hollow table portion, with a downwardly facing pocket;
  (b) said table portion including a generally horizontally disposed, flat deck with an opening extending vertically therethrough in communication with said pocket;
  (c) a film retaining and transporting carriage slidably mounted on said deck for reciprocal movement on opposite sides of said opening longitudinally of the deck between first and second positions located forwardly and rearwardly adjacent said deck opening;
  (d) said film carriage including aligned, upwardly projecting pins for positioning a pair of film strip ends thereon;
  (e) tape feeding mechanism mounted in said table pocket and extending upwardly through said deck opening for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

14. A device for splicing adjacent ends of a pair of motion picture film strips in end-to-end, abutting relation by wrapping them with a band of adhesive, transparent material, such as plastic tape, from roll stock, comprising:
  (a) a base member having a table portion;
  (b) said table portion including a generally horizontally disposed, flat deck with an opening extending vertically therethrough;
  (c) a film retaining and transporting carriage slidably mounted on said deck for reciprocal movement on opposite sides of said opening longitudinally of the deck between first and second positions located forwardly and rearwardly adjacent said deck opening;
  (d) a mechanism for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

15. A device for splicing adjacent ends of a pair of motion picture film strips in end-to-end, abutting relation by wrapping them with a band of adhesive, transparent material, such as plastic tape, from roll stock, comprising:
  (a) a base member having a table portion;
  (b) said table portion including a generally horizontally disposed, flat deck with an opening extending vertically therethrough;
  (c) a film retaining and transporting carriage slidably mounted on said deck for reciprocal movement longitudinally of the deck between first and second positions located on opposite ends of said deck opening;
  (d) a tape transporting mechanism for feeding a free end of the tape across said abutting film strip ends when they are on the film carriage at said first position, so that when the film strip ends are transported by the carriage over said deck opening to said second position a band of tape will be wrapped around both the upper and lower surfaces of said film strip ends.

16. A device for splicing adjacent ends of a pair of motion picture film strips by wrapping them with a band of adhesive, transparent tape from roll stock, comprising:
  (a) a base member including a generally horizontally disposed deck with an opening extending vertically therethrough;
  (b) a film retaining and transporting carriage movably mounted on said deck for reciprocal movement between first and second positions located on opposite sides of said opening;
  (c) means for feeding a free end of said tape up through said opening and across said film strip ends when said carriage is at said first position, so that when said carriage is moved across said opening from said first position to said second position the tape will be wrapped around said film ends; and
  (d) cutting means for severing said tape at the side edges of said film strip ends.

17. A device for splicing adjacent ends of a pair of motion picture film strips by wrapping them with a band of adhesive, transparent tape from roll stock, comprising:
  (a) a base member including a deck with an opening extending therethrough;
  (b) a film retaining and transporting carriage movably mounted on said deck for reciprocal movement between first and second positions located on opposite sides of said opening;
  (c) means for feeding a free end of said tape through said opening and across said film strip ends when said carriage is at said first position, so that when said carriage is moved across said opening from said first position to said second position the tape will be wrapped around said film ends; and
  (d) cutting means for severing said tape at the side edges of said film strip ends.

References Cited in the file of this patent
UNITED STATES PATENTS

| | | |
|---|---|---|
| 2,346,142 | Anderson | Apr. 11, 1944 |
| 3,050,107 | Barry et al. | Aug. 21, 1962 |